United States Patent
O'Connor

(10) Patent No.: US 9,550,608 B2
(45) Date of Patent: Jan. 24, 2017

(54) FLEXIBLE BAG MATERIAL

(75) Inventor: Sean O'Connor, Cockermouth (GB)

(73) Assignee: AMCOR FLEXIBLES DREUZLINGEN LTD., Kreuzlingen (CH)

( * ) Notice: Subject to any disclaimer, the term of this patent is extended or adjusted under 35 U.S.C. 154(b) by 729 days.

(21) Appl. No.: 13/996,252

(22) PCT Filed: Dec. 2, 2011

(86) PCT No.: PCT/EP2011/006053
§ 371 (c)(1),
(2), (4) Date: Nov. 25, 2013

(87) PCT Pub. No.: WO2012/084127
PCT Pub. Date: Jun. 28, 2012

(65) Prior Publication Data
US 2014/0075895 A1 Mar. 20, 2014

(30) Foreign Application Priority Data
Dec. 23, 2010 (EP) .................................... 10405247

(51) Int. Cl.
B65B 1/04 (2006.01)
B65D 33/00 (2006.01)
(Continued)

(52) U.S. Cl.
CPC .............. B65D 33/00 (2013.01); B32B 27/08 (2013.01); B32B 27/10 (2013.01); B32B 27/32 (2013.01);
(Continued)

(58) Field of Classification Search
CPC ................. B32B 2307/702; B32B 2307/7246; B32B 2307/7248; B32B 2307/748; B32B 2439/70; B32B 27/08; B32B 27/10; B32B 27/32; B32B 27/36; B65B 1/04; B65D 31/02; B65D 33/00; B65D 77/062; Y10T 428/1334
(Continued)

(56) References Cited

U.S. PATENT DOCUMENTS 4,813,207 A 3/1989 Rundle
4,982,872 A 1/1991 Avery
(Continued)

FOREIGN PATENT DOCUMENTS

CA 2412434 6/2001
EP 0239319 9/1987
(Continued)

OTHER PUBLICATIONS

Russian Office Action mailed Jun. 15, 2015 in Russian Application No. 2013134258/05(051270), including English translation.
(Continued)

Primary Examiner — Yan Lan
(74) Attorney, Agent, or Firm — RatnerPrestia

(57) ABSTRACT

A flexible bag material made of plastic material for the packaging of dry food products such as cereals wherein the plastic material is a multilayer film. The multilayer film comprises at least one high moisture barrier layer made of HDPE, a moderate oxygen barrier layer made of a blend of amorphous polyethylene terephthalate (PETG) and PE having a oxygen permeability of 400 $cm^3/m^2$/day or higher when measured at 23° C. and 0% relative humidity, and a peelable sealing layer. The flexible bag material is especially suitable for manufacturing an inner bag of a bag-in-box package having an outer rigid box made of cardboard, in particular recycled cardboard.

20 Claims, 1 Drawing Sheet

(51) Int. Cl.
*B65D 30/08* (2006.01)
*B32B 27/06* (2006.01)
*B32B 27/36* (2006.01)
*B32B 27/08* (2006.01)
*B32B 27/32* (2006.01)
*B65D 77/06* (2006.01)
*B32B 27/10* (2006.01)

(52) U.S. Cl.
CPC ............... *B32B 27/36* (2013.01); *B65B 1/04* (2013.01); *B65D 31/02* (2013.01); *B65D 77/062* (2013.01); *B32B 2307/702* (2013.01); *B32B 2307/7246* (2013.01); *B32B 2307/7248* (2013.01); *B32B 2307/748* (2013.01); *B32B 2439/70* (2013.01); *Y10T 428/1334* (2015.01)

(58) Field of Classification Search
USPC ..................... 156/163; 428/35.2; 53/469
See application file for complete search history.

(56) References Cited

U.S. PATENT DOCUMENTS

| | | | | |
|---|---|---|---|---|
| 5,203,470 | A | * | 4/1993 | Brown ............... B65D 77/065 |
| | | | | 222/105 |
| 6,455,161 | B1 | | 9/2002 | Regnier et al. |
| 6,541,087 | B1 | | 4/2003 | Pophusen |
| 6,716,499 | B1 | | 4/2004 | Vadhar |
| 2003/0044492 | A1 | | 3/2003 | Knigge |
| 2006/0073294 | A1 | * | 4/2006 | Hutchinson ............ B29C 44/04 |
| | | | | 428/35.7 |
| 2007/0217719 | A1 | | 9/2007 | Smith |
| 2009/0208717 | A1 | | 8/2009 | Enzinger |
| 2009/0220717 | A1 | | 9/2009 | Wilczak |
| 2009/0297814 | A1 | * | 12/2009 | Curie ..................... B32B 27/08 |
| | | | | 428/220 |

FOREIGN PATENT DOCUMENTS

| | | |
|---|---|---|
| EP | 1 658 973 A1 | 5/2006 |
| EP | 2202172 | 6/2010 |
| FR | 2914284 | 10/2008 |
| RU | 2252183 | 5/2005 |
| WO | 2006011842 | 2/2006 |

OTHER PUBLICATIONS

Jane Bryne; "*Bag-in-box cereal liner now protects flavor and aroma says Amcor*", Oct. 26, 2010, www.foodproductinodialy.com/Packaging/Bag-inbox-cereal.

PCT International Search Report for Application No. PCT/EP2011/006053, Mailed Apr. 16, 2012.

European Search Report mailed May 25, 2011 for European Application No. 10405247.7.

European Office Action mailed Sep. 18, 2015 for European Application No. 11804639.0.

European Search Report dated Feb. 10, 2016 for European Application No. 11804639.0.

Russian Decision on Grant for Russian Application No. 2013134258/05(051270), with translation, dated Jun. 20, 2016, 13 pages.

* cited by examiner

FLEXIBLE BAG MATERIAL

CROSS-REFERENCE TO RELATED APPLICATIONS

This is a U.S. National Phase application of International application number PCT/EP2011/006053, filed Dec. 2, 2011, which claims priority benefit of European Application number 10 405 247.7, filed Dec. 23, 2010, both of which are incorporated herein by reference in their entirety for all purposes.

FIELD OF THE INVENTION

The invention relates to a flexible bag material made of plastic material for the packaging of dry food products such as cereals.

BACKGROUND OF THE INVENTION

EP-A-1658973 discloses a packaging film providing some oxygen permeability for packaging food products requiring oxygen permeability.

WO-A-2006/011842 describes a rigid permeable packaging material for perishables having a microbiological activity, the packaging material providing a carbon dioxide gas barrier and an oxygen gas barrier that can be controlled independently of the thickness of the packaging material.

Flexible bags made of plastic material may be used for the inner bag of bag-in box packages. Hereby, a flexible bag is inserted into an outer box made of cardboard material. Those packages offer the advantage that the cardboard can be easily printed and, after use, can be folded flat and recycled. Furthermore, those packages usually have a form which allows good product presentation on the retailer shelves.

U.S. Pat. No. 5,203,470 describes a bag-in-box composite container for storing and pouring out liquids as e.g. milk or wine. Those containers consist basically of a plastic inner bag having a pouring spout within a sturdy outer paperboard box.

Contaminants diffusing through the plastic inner bag may become a problem, especially when using recycled paperboard, cardboard or carton material. Over the past few years there has been a growing awareness and concern regarding contaminants in recycled board materials, or printing inks as well as other external environment contaminants migrating into food products.

For bag-in-box food packages where recycled paperboard, cardboard or carton is used for economical and logistical reasons to produce the outer box and where the inner bag material does not provide a functional barrier to volatile contaminants migrating out of the paperboard box a particular problem may be caused by hydro-carbon mineral oils as e.g MOSH (mineral oil saturated hydrocarbons), a typical volatile contaminant comprised in recycled paperboard material. In such circumstances, the food product may become contaminated and yielded unfit for consumption. For reducing this problem an outer box material made of virgin paperboard may be used, but this may incur significant extra costs and may also result in possible supply problems as virgin board is often in global short supply. Furthermore, volatile contaminants (sometimes just named volatiles) can also come from the printing inks used on the cartons.

As an alternative to prevent migration of contaminants into the food of a bag-in-box package, the inner bag may be manufactured from a high barrier complex laminate. Such an inner bag would typically consist of a multi process laminate structure containing two or more individual film and/or foil layers. Aluminium or other oxide based barrier layers would typical be incorporated. Such structures would generally require a multiple process manufacturing regime with all the inherent costs and environmental impacts. A known material used to date as good barrier material is a metallised laminate with typically 18 µm metallised OPP/35 µm HDPE-Surlyn. Even if such a laminate solves some problems, it would not be useable for some dry food packages as e.g. the majority of cereal products, because most of those cereals need to 'breath', but a metallised OPP/HDPE laminate is a high oxygen barrier which does not allow the required breathability to take place.

SUMMARY OF THE INVENTION

It is an object of the invention to provide a flexible plastic bag material for packaging dry food products such as cereals, which performs a good hot tack and peel sealability and provides a good moisture barrier, but allows some predefined oxygen permeability.

It is a further object of the invention to provide a good barrier to prevent migration of volatiles, especially short chain hydrocarbons, from the environment into a bag made of said flexible bag material.

An even further object of this invention is to provide a flexible bag material that provides a good barrier for odours or flavours.

The foregoing objects are achieved by a flexible bag material having the features of claim 1.

The flexible bag material is a multilayer film comprising at least one high moisture barrier layer made of high density polyethylene (HDPE), a moderate oxygen barrier layer made of an extruded blend of amorphous polyethylene terephthalate (PETG) and polyethylene (PE) having an oxygen permeability of 400 $cm^3/m^2$/day or higher when measured at 23° C. and 0% relative humidity, and a peelable sealing layer.

DETAILED DESCRIPTION OF THE INVENTION

The moderate oxygen barrier layer requires the use of an extruded blend of PETG and PE in order to achieve a specific polymer morphology, i.e. specific chemical structure combined with a specific arrangement of the polymer chains, so that areas of the polymer structure are opened up to allow oxygen to more easily permeate through the PETG/PE layer.

Preferred embodiments of the inventive flexible bag material are described in the dependent claims.

The oxygen permeability of the moderate oxygen barrier layer is influenced by its composition and its layer thickness. A comparison of the oxygen permeability of a 9 µm thick oxygen barrier layer consisting of pure PETG with 9 µm thick layers made of an extruded blend of PETG and PE is shown in table 1. The oxygen permeability values have been measured at 23° C. and 0% relative humidity.

TABLE 1

| oxygen barrier composition | oxygen permeability [cm³/m²/day] |
|---|---|
| 100% PETG | 250 |
| 90 weight-% PETG and 10 weight-% PE | 340 |
| 80 weight-% PETG and 20 weight-% PE | 480 |

Table 1 shows that without blending the PETG material of the oxygen barrier layer with a blending partner, the barrier function is too high for packaging applications of most dry food products, as e.g. cereals, as those products require a breathability or oxygen permeability of 400 cm³/m²/day or more, preferably 450 cm³/m²/day or more. As blending partner the application of a polyethylene-based polymer is preferred. Other blending partners could be PP-based polymers.

The inventive flexible bag material provides also a functional barrier to moisture, short chain hydrocarbon contaminants and odours or flavours in a "single film" structure, wherein at the same time this flexible bag material ensures a predefined breathability or oxygen permeability.

The oxygen and moisture permeability of state-of-the-art packaging materials have been measured and compared with the corresponding properties of the inventive flexible bag material. The corresponding results are shown in Table 2. The oxygen permeability values have been measured at 23° C. and 0% relative humidity, and the moisture permeability (Moisture Vapor Transmission Rate) has been measured at 38° C. and 90% relative humidity. The new flexible bag material has an outer HDPE moisture barrier layer and a 9 µm thick layer of an extruded blend of 80 weight-% PETG and 20 weight-% PE as well as an inner ionomer layer and comprises on both sides of the oxygen barrier layer a tie layer to improve the bonding of the HDPE and ionomer layers. The thickness of the complete flexible bag material tested is 60 µm.

TABLE 2

| film structure | oxygen permeability [cm³/m²/day] | moisture permeability [g/m2/day] |
|---|---|---|
| new flexible bag material | 480 | 3.6 |
| 12 µm PET/50 µm PE laminate | <100 | 6 |
| 18 µm metallised OPP/ 37 µm HDPE-ionomer laminate | <30 | 0.3 |

The invention is a mono web multilayer film, i.e. a film comprising a number of individual layers that is manufactured in a one-step single process, where all layers are extruded and bonded together initially under the influence of heat and herewith bonded together chemically. The mono web multilayer film according to the invention preferably is manufactured by a co-extrusion process or a combination of co-extrusion and coating where one or more, or a combination of those layers provide a barrier to volatiles, especially short chain hydrocarbons, and provide a pre-defined breathable or oxygen permeable functional barrier to materials packed in a flexible bag made of the inventive multilayer film material. The inventive mono web multilayer film also comprises a peelable sealing layer preferably made of a ionomer or an alternative high performance peel/seal polymer.

The layers may consist of pure barrier resins or blends of barrier resins and other functional materials and/or fillers.

The inventive flexible bag material also provides low levels of moisture permeability and may also provide other functions such as very good hot tack and peel sealability.

The flexible bag material according to the invention is lower in cost than known packaging materials, has a lower environmental impact and a better life cycle analysis.

The inventive flexible bag material is especially suitable for manufacturing an inner bag of a bag-in-box packaging having an outer rigid box made of cardboard, in particular when recycled cardboard is used as rigid box material. In this latter case, the inventive flexible bag material is demonstrated to provide a functional barrier against contaminates between the recycled board material of the outer rigid box of a bag-in-box packaging and the product contained in the inner flexible bag. The inventive bag material is a mono web film which provides the required volatile barrier and allows a packed dry food, especially cereals, to breath at the same time.

Most cereals such as Cornflakes release Hexanal's etc. and if 'trapped' in the inner bag will give an 'off taste/smell' to the consumer upon opening the pack. If the cereal is packed in a structure with a high oxygen barrier (oxygen permeability of less than 400 cm³/m²/day), it can't breath. Because all known packaging materials providing a volatile barrier and at the same time allow some oxygen permeability show a high oxygen barrier, i.e. an oxygen permeability of far less than 400 cm³/m²/day, and hence are not suitable for packing the majority of cereal products.

Cereals require a packaging material that delivers:
a) A high moisture barrier, because most dry cereals are very hygroscopic. The high moisture barrier is achieved by HDPE layers.
b) A moderate oxygen barrier. This moderate oxygen barrier is achieved by blending the amorphous polyethylene terephthalate or glycol-modified polyethylene terephthalate (PETG) layer with another polymer. If the oxygen barrier is too good, some products can't breathe, e.g. cornflakes. This eliminates coextruded structures such as PET/PE, Nylon/PE or EVOH, or a 18 µm thick metallised OPP/35 µm HDPE-ionomer as e.g. Surlyn.
c) An odour or flavour barrier, e.g. for chocolate containing cereals. The odour or flavour barrier is achieved by a PETG layer.
d) A volatiles barrier layer to prevent and/or slow down the migration of short chain hydrocarbons, e.g. mineral oils that e.g. may come from recycled paper board materials and/or printing inks. The volatiles barrier is achieved by a blended PETG layer.
e) The film also needs to have wide temperature differential to run on VFFS (vertical form fill and seal) packaging machines, high hot tack to seal through dust and contamination and also delivery of an easy to open/peelable seal functionality. Consequently, said film is designed to seal in a temperature range from 95° C. to 127° C., i.e. there is a seal window of 32° C. This is an important characteristic for the film to run well on VFFS (Vertical Form Fill and Seal machines).

The inventive flexible bag material combines all properties required for a cereal liner, i.e. moisture barrier properties and high performance peelable sealing properties and in addition incorporates required oxygen permeability properties.

All these requirements are achieved by using a combination of HDPE, PETG/PE and ionomers or an alternative high performance peelable seal material in a multilayer co-extrusion process.

HDPE-layers not only serve as moisture barrier, but provide also high heat resistance properties and improve film resistance of the flexible bag material.

In order to bond HDPE- and PETG-based layers, the application of tie layers is usually required. Because packages for dry food usually have to be peelable, a preferred sealing layer consists of a ionomer. Preferably, the multilayer film is a blown film.

BRIEF DESCRIPTION OF THE DRAWINGS

Further advantages, features and details of the invention are revealed in the following description of preferred exemplified embodiments and with the aid of the drawings which show schematically in FIG. 1 a cross-sectional view through a first embodiment of an inventive flexible bag material.

The middle layer 40 is an oxygen barrier layer allowing the migration of oxygen to a predefined extent. Said middle layer 40 is made of a blend of PETG and PE wherein the PETG content is about 80 weight-% and the PE content amounts to about 20 weight-%. Said middle layer serves not only as oxygen barrier, but also as volatiles barrier and/or as flavour barrier. Therefore, the composition and thickness of the middle layer has to be optimised in the sense that on the one hand the oxygen barrier function is not too high, and on the other hand the barrier function for volatiles and/or flavour is high enough for protecting the dry food packaged in such a flexible bag material.

In order to ensure good bonding of the middle layer 40 with the moisture barrier layer 10 and the sealing layer 50, the flexible bag material features on both sides of the middle layer 40 a tie layer 30.

Figure 1:
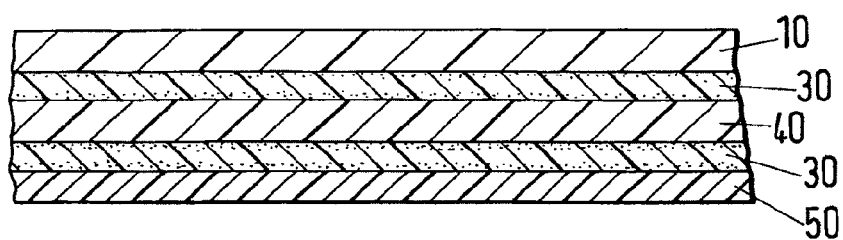
FIG. 1 shows a cross-section of the multilayer film of a first flexible bag material. The multilayer has an outside HDPE layer 10 serving as high moisture barrier layer and an inner peelable sealing layer 50 which is made of a ionomer or an alternative high performance sealing material allowing easy peeling before use. The term 'outside layer' and 'inner layer' refer to a packaging made of such a multilayer film wherein the inner side is directed to the food receiving area and the outer side is directed to the environment of the package. The package is a flexible bag for receiving dry food.
Figure 2:
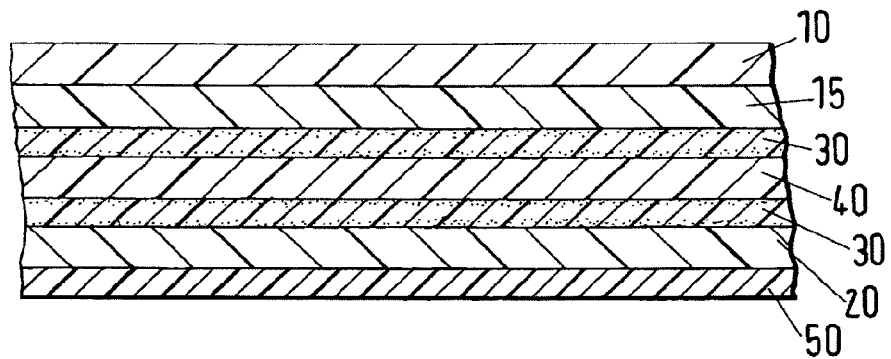
FIG. 2 a cross-sectional view through a second embodiment of an inventive flexible bag material.

FIG. 2 shows a cross-section of the multilayer film of a second flexible bag material. The multilayer has an outside HDPE layer 10 serving as high moisture barrier layer and an underlying second HDPE layer 15 as further moisture barrier layer which additionally improves tear strength of the flexible bag material. This moisture and strength improving layer 15 is bonded to a moderate oxygen barrier layer 40 via a tie layer 30. The moderate oxygen barrier layer 40 further serves as volatiles barrier layer to prevent migration or diffusion of short chain hydrocarbons as well as flavour barrier to prevent diffusing out of flavour of dry food packed in said flexible bag material. Onto said moderate oxygen barrier layer 40 there is deposited a further tie layer for improving the bonding of a further moisture barrier layer 20 made of HDPE. The latter moisture barrier layer is covered by a sealing layer 50.

The invention claimed is:

1. A flexible bag material made of plastic material for the packaging of dry food products, wherein the plastic material is a mono web multilayer film comprising at least a first moisture barrier layer made of HDPE, an oxygen barrier layer made of an extruded blend of an amorphous polyethylene terephthalate (PETG) and a polyethylene-based polymer (PE) having an oxygen permeability of 400 cm$^3$/m$^2$/day or higher when measured at 23° C. and 0% relative humidity, and a peelable sealing layer, wherein the first moisture barrier layer is on one side of the mono web multilayer film, the peelable sealing layer is on the opposite outer side of the mono web multilayer film and the oxygen barrier layer is between the first moisture barrier layer and the peelable sealing layer.

2. A flexible bag material according to claim 1, wherein the mono web multilayer film further comprises a volatiles barrier layer made of an extruded blend of amorphous polyethylene terephthalate (PETG) and a polyethylene-based polymer (PE) for preventing or slowing down the migration of short chain hydrocarbons or hydro-carbon mineral oils.

3. A flexible bag material according to claim 1, wherein the mono web multilayer film further comprises an odour or flavour barrier layer made of an extruded blend of amorphous polyethylene terephthalate (PETG) and a polyethylene-based polymer (PE).

4. A flexible bag material according to claim 1, wherein the peelable sealing layer is made of a ionomer.

5. A flexible bag material according to claim 1, wherein the oxygen barrier layer made of an extruded blend of PETG and PE has an oxygen permeability greater than 450 cm$^3$/m$^2$/day when measured at 23° C. and 0% relative humidity.

6. A flexible bag material according to claim 1, wherein the first moisture barrier layer has a Moisture Vapor Transmission Rate of less than 5 g/m$^2$/day measured at 38° C. and 90% relative humidity.

7. A flexible bag material according to claim 1, wherein the oxygen barrier layer contains an extruded blend of less than 85 weight-% PETG, wherein the rest of the blend is a polyethylene-based polymer (PE).

8. A flexible bag material according to claim 1, wherein the mono web multilayer film additionally comprises between the oxygen barrier layer and the outer peelable sealing layer an additional moisture barrier layer made of HDPE.

9. A flexible bag material according to claim 1, wherein the mono web multilayer film additionally comprises on at least one side of the oxygen barrier layer a supplemental tie layer for bonding layers comprising PETG with layers comprising HDPE.

10. A flexible bag material according to claim 1, wherein at least a part of the layers consist of barrier resins or blends of barrier resins.

11. A flexible bag material according to claim 1, wherein the mono web multilayer film is a coextruded film.

12. A method for packaging a dry food product, comprising using the flexible bag material according to claim 1 to package the dry food product.

13. A method of making an inner bag of a bag-in-box package having an outer rigid box made of cardboard, comprising using the flexible bag product according to claim 1 to manufacture the inner bag.

14. A flexible bag material according to claim 1, wherein the oxygen barrier layer contains an extruded blend of less than 80 weight-% PETG, wherein the rest of the blend is a polyethylene-based polymer (PE).

15. A flexible bag material according to claim 1, wherein the mono web multilayer film is a blown coextruded film.

16. The method of claim 12, wherein the dry food product is a cereal.

17. The method of claim 13, wherein the cardboard is recycled cardboard.

18. A flexible bag material according to claim 1, wherein the mono web multilayer film additionally comprises a first tie layer on one side of the oxygen barrier layer between the oxygen barrier layer and the first moisture barrier layer and a second tie layer on the opposite side of the oxygen barrier layer between the oxygen barrier layer and the peelable sealing layer.

19. A flexible bag material according to claim 1, wherein the oxygen barrier layer contains an extruded blend of about 80 weight-% PETG and about 20 weight-% polyethylene-based polymer (PE).

20. A flexible bag material according to claim 1, wherein the mono web multilayer film additionally comprises a second moisture barrier layer made of HDPE underlying the first moisture barrier layer made of HDPE.

* * * * *

UNITED STATES PATENT AND TRADEMARK OFFICE
CERTIFICATE OF CORRECTION

PATENT NO.         : 9,550,608 B2  
APPLICATION NO.    : 13/996252  
DATED              : January 24, 2017  
INVENTOR(S)        : Sean O'Connor Page 1 of 1

It is certified that error appears in the above-identified patent and that said Letters Patent is hereby corrected as shown below:

On the Title Page

[73] Assignee should read: -- AMCOR FLEXIBLES KREUZLINGEN LTD. --

Signed and Sealed this  
Fourth Day of April, 2017

Michelle K. Lee  
*Director of the United States Patent and Trademark Office*